United States Patent
George et al.

(10) Patent No.: US 12,425,451 B2
(45) Date of Patent: Sep. 23, 2025

(54) DATA STORAGE

(71) Applicant: Nokia Technologies Oy, Espoo (FI)

(72) Inventors: Jos George, Kochi (IN); Dominique Chiaroni, Antony (FR)

(73) Assignee: Nokia Technologies Oy, Espoo (FI)

( * ) Notice: Subject to any disclaimer, the term of this patent is extended or adjusted under 35 U.S.C. 154(b) by 301 days.

(21) Appl. No.: 18/001,016

(22) PCT Filed: Jun. 17, 2021

(86) PCT No.: PCT/FI2021/050460
§ 371 (c)(1),
(2) Date: Dec. 7, 2022

(87) PCT Pub. No.: WO2021/260265
PCT Pub. Date: Dec. 30, 2021

(65) Prior Publication Data
US 2023/0216886 A1 Jul. 6, 2023

(30) Foreign Application Priority Data
Jun. 24, 2020 (IN) .............................. 202041026719

(51) Int. Cl.
*H04L 9/40* (2022.01)
*H04J 14/02* (2006.01)

(52) U.S. Cl.
CPC .......... *H04L 63/18* (2013.01); *H04J 14/0293* (2013.01)

(58) Field of Classification Search
None
See application file for complete search history.

(56) References Cited

U.S. PATENT DOCUMENTS

| | | | | |
|---|---|---|---|---|
| 6,571,030 B1* | 5/2003 | Ramaswami | ...... | H04Q 11/0062 385/48 |
| 6,882,765 B1* | 4/2005 | Erickson | ............. | H04J 14/0293 398/20 |
| 2002/0054406 A1* | 5/2002 | Duerksen | ............ | H04J 14/0204 398/67 |
| 2006/0173851 A1* | 8/2006 | Singh | .................. | G06F 21/6218 |

(Continued)

FOREIGN PATENT DOCUMENTS

| | | |
|---|---|---|
| WO | 2016/079371 A1 | 5/2016 |
| WO | 2019/077319 A1 | 4/2019 |

OTHER PUBLICATIONS

"What is FIDO U2F?", Yubico, Retrieved on Dec. 21, 2022, Webpage available at: https://www.yubico.com/authentication-standards/fido-u2f/.

(Continued)

*Primary Examiner* — Raqiul A Choudhury
(74) *Attorney, Agent, or Firm* — Laine IP Oy

(57) ABSTRACT

According to an example aspect of the present invention, there is provided an apparatus comprising a first part (110) which comprises a first light-based communication port (114) and a network interface (112), a second part (120) which comprises a non-volatile memory (122) and a second light-based communication port (124), and wherein the apparatus is configured to deactivate at least one of the first light-based communication port (114) and the second light-based communication port (124) responsive to determining that a read or write operation in the non-volatile memory (122) is complete.

15 Claims, 6 Drawing Sheets

(56) References Cited

U.S. PATENT DOCUMENTS

| | | |
|---|---|---|
| 2010/0037021 A1 | 2/2010 | Ozeki et al. |
| 2014/0317420 A1 | 10/2014 | Daniels |
| 2017/0068471 A1* | 3/2017 | Paveza .................. G06F 3/0685 |
| 2017/0155981 A1* | 6/2017 | Nakagawa .......... H04J 14/0276 |
| 2017/0310393 A1 | 10/2017 | Telesca |
| 2017/0359725 A1* | 12/2017 | Bolte .................. H04W 12/068 |

OTHER PUBLICATIONS

"Offline certification authority best practices", White Paper, Entrust, Nov. 2020, 20 pages.
International Search Report and Written Opinion received for corresponding Patent Cooperation Treaty Application No. PCT/FI2021/050460, dated Sep. 22, 2021, 15 pages.
Extended European Search Report received for corresponding European Patent Application No. 21828763.9, dated May 27, 2024, 10 pages.

* cited by examiner

Communicating, by a first part of an apparatus, with a second part of the apparatus using a first light-based communication port and communicating, by the first part, with a client using a network interface comprised in the first part — 510

Communicating, by the second part of the apparatus, the second part comprising non-volatile memory, with the first part using a second light-based communication port comprised in the second part — 520

Deactivating at least one of the first light-based communication port and the second light-based communication port responsive to determining that a read or write operation in the non-volatile memory is complete — 530

FIGURE 6

DATA STORAGE

RELATED APPLICATION

This application was originally filed as PCT Application No. PCT/FI2021/050460, filed on Jun. 17, 2021, which claims priority from IN application No. 202041026719, filed on Jun. 24, 2020, each of which is incorporated herein by reference in its entirety.

FIELD

The present disclosure relates to secure storage of data, such as, for example, secure storage of user data or corporate data.

BACKGROUND

The amount of data individual users and businesses generate has increased over the past ten years, and is foreseen to increase further. Data of users and businesses often comprises personal and confidential information, wherefore storing the data needs to be accomplished in a secure manner. Fifth generation, 5G, mobile networking is foreseen to trigger a further increase in data volumes, while cloud-based data storage is seen as risky.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising a first part which comprises a first light-based communication port and a network interface, a second part which comprises a non-volatile memory and a second light-based communication port, and wherein the apparatus is configured to deactivate at least one of the first light-based communication port and the second light-based communication port responsive to determining that a read or write operation in the non-volatile memory is complete.

According to a second aspect of the present disclosure, there is provided a method comprising communicating, by a first part of an apparatus, with a second part of the apparatus using a first light-based communication port comprised in the first part and communicating, by the first part, with a client using a network interface comprised in the first part, communicating, by the second part of the apparatus, the second part comprising a non-volatile memory, with the first part using a second light-based communication port comprised in the second part, and deactivating at least one of the first light-based communication port and the second light-based communication port responsive to determining that a read or write operation in the non-volatile memory is complete.

According to a third aspect of the present disclosure, there is provided an apparatus comprising means for communicating, by a first part of the apparatus, with a second part of the apparatus using a first light-based communication port comprised in the first part and communicating, by the first part, with a client using a network interface comprised in the first part, communicating, by the second part of the apparatus, the second part comprising a non-volatile memory, with the first part using a second light-based communication port comprised in the second part, and for deactivating at least one of the first light-based communication port and the second light-based communication port responsive to determining that a read or write operation in the non-volatile memory is complete.

According to a fourth aspect of the present disclosure, there is provided a non-transitory computer readable medium having stored thereon a set of computer readable instructions that, when executed by at least one processor, cause an apparatus to at least communicating, by a first part of the apparatus, with a second part of the apparatus using a first light-based communication port comprised in the first part and communicating, by the first part, with a client using a network interface comprised in the first part, communicating, by the second part of the apparatus, the second part comprising a non-volatile memory, with the first part using a second light-based communication port comprised in the second part, and deactivating at least one of the first light-based communication port and the second light-based communication port responsive to determining that a read or write operation in the non-volatile memory is complete.

According to a fifth aspect of the present disclosure, there is provided a computer program configured to cause an apparatus to perform at least the following, when run on at least one processing core: communicating, by a first part of the apparatus, with a second part of the apparatus using a first light-based communication port comprised in the first part and communicating, by the first part, with a client using a network interface comprised in the first part, communicating, by the second part of the apparatus, the second part comprising a non-volatile memory, with the first part using a second light-based communication port comprised in the second part, and deactivating at least one of the first light-based communication port and the second light-based communication port responsive to determining that a read or write operation in the non-volatile memory is complete.

BRIEF DESCRIPTION OF THE DRAWINGS

FIG. 6 is a flow graph of a method in accordance with at least some embodiments of the present invention.

EMBODIMENTS

An apparatus as herein disclosed is enabled to store data at rest in a two-part architecture, such that a first part of the apparatus is a front end connected with a network, and the second part of the apparatus comprises a non-volatile memory for storing the data, and the second part is not directly connected to a public network in the sense that it would be accessible from this network by normal addressing. A light-encoded connection is provided between the first and second parts, to enable writing data to the non-volatile memory of the second part, and retrieving the data from the non-volatile memory. The light-encoded connection may be switched off when authorized reads or writes are not taking place, severing communications to the second part. Further, a mechanical optical shutter may be provided to physically prevent optical communication between the first part and the second part when authorized reads or writes are not taking place.

Figure 1:
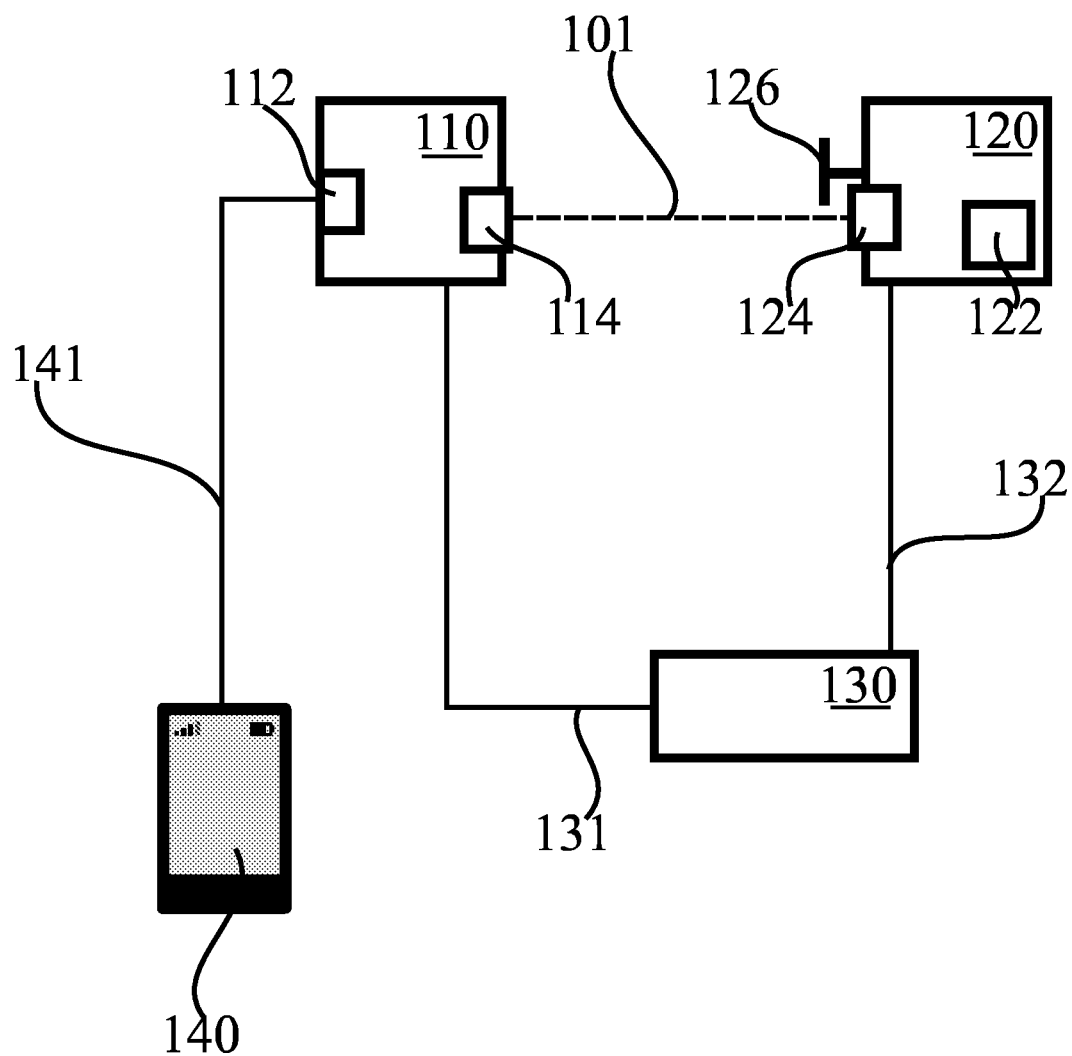
FIG. 1 illustrates an example system in accordance with at least some embodiments of the present invention.

FIG. 1 illustrates an example system in accordance with at least some embodiments of the present invention. The system comprises a data storage apparatus which comprises first part 110 and second part 120. First part is connected with a network, which may be a public network or communicatively connected with a public network, for example. Network interface 112 enables communication with the network, for example to enable client 140 to send data to first part 110, and to receive data from first part 110. A connection between client 140 and first part 110 is schematically illustrated in FIG. 1 as connection 141. Connection 141 may be wire-based or at least in part wireless, for example. Connection 141 may traverse one or more networks. Client 140 may be a user, such as an individual person, or a business, with data to securely store in the data storage apparatus. Client 140 may have an address, such as an internet protocol, IP, address, of first part 110 to enable communication with first part 110. Likewise, client 140 may have a public encryption key of first part 110 to secure communication over connection 141, for example. Client 140 may comprise a 5G user equipment, UE. Communication over connection 141 may be secured using transport layer security, TLS, for example. First part 110 further comprises a light-based communication port 114, which may comprise, for example, a bidirectional light-based communication port with an optical receiver an a programmable light source. The light source may comprise a light-emitting diode, LED, based source or a laser source, for example. Where a LED source is used, the LED source may be configured to produce a directional beam of light.

Second part 120 of the data storage apparatus comprises a light-based communication port 124 configured to communicate with light-based communication port 114 of first part 110. Light beam 101 may be used to convey information wirelessly from first part 110 to second part 120, and from second part 120 to first part 110. Light-based communication may encode information into light beam 101 by modulating intensity and/or polarization of the light, for example. Further, second part 120 comprises a non-volatile memory 122, which has the data storage capacity of the data storage apparatus. Non-volatile memory 122 may comprise a magnetic hard disk or assembly of magnetic hard disks, optical memory and/or solid-state memory, for example.

Figure 2:
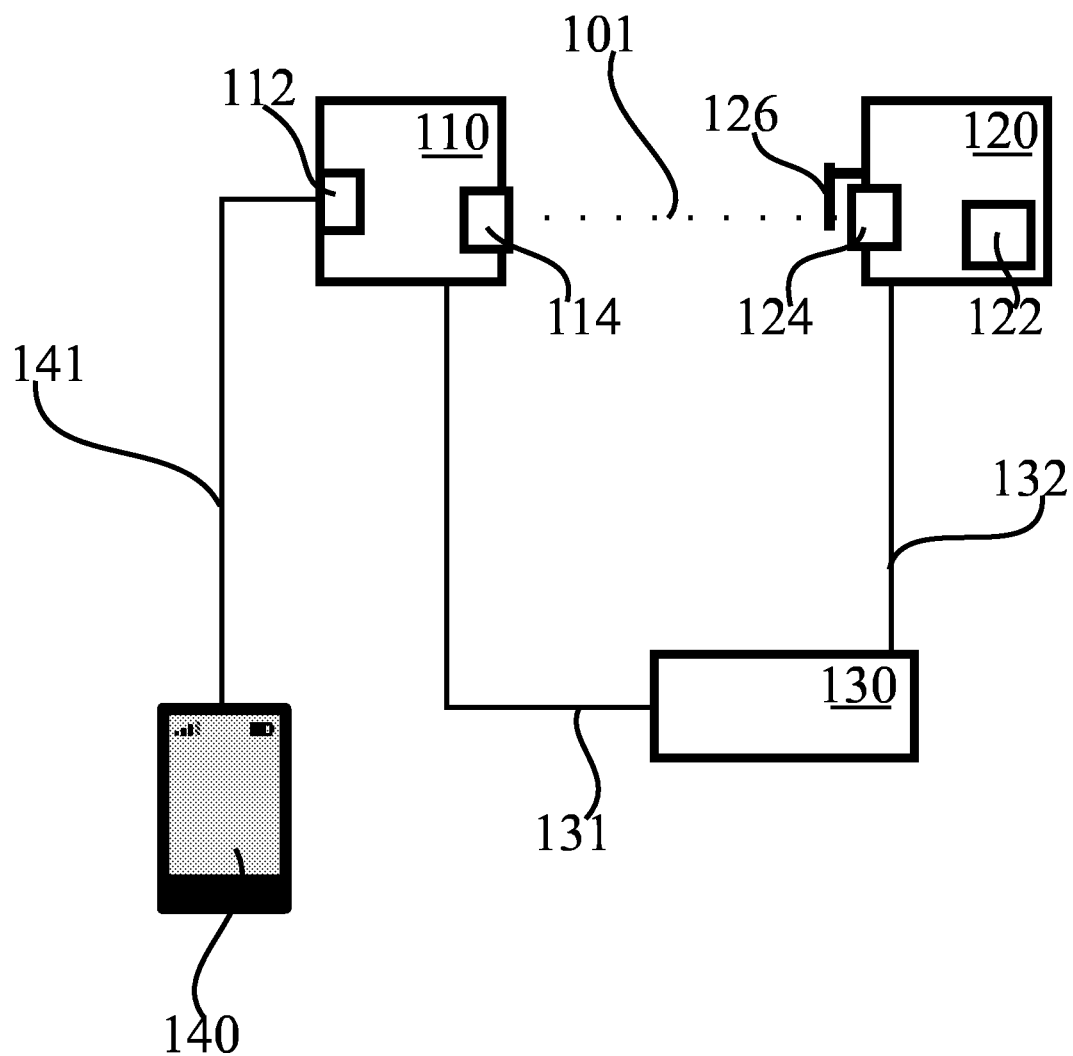
FIG. 2 illustrates an example system in accordance with at least some embodiments of the present invention.

Second part 120 may comprise an optical shutter 126, which may be arranged selectably in a first position and a second position. In detail, in the first position the optical shutter exposes light-based communication ports 114, 124 to each other, as illustrated in FIG. 1. In the first position, light beam 101 is enabled and not blocked. In the second position, the shutter obstructs light beam 101 from communicatively coupling first part 110 and second part 120. This is illustrated in FIG. 2. In other words, in the second position light-based communication ports 114, 124 are obstructed to each other, by optical shutter 126. In some embodiments, optical shutter 126 is absent. In some embodiments, optical shutter 126 is comprised in first part 110, and not in second part 120, as illustrated in FIG. 1. In yet further embodiments, optical shutters are present in both first part 110 and second part 120.

Control node 130, physically distinct from the data storage apparatus, is connected with first part 110 via connection 131 and, optionally, with second part 120 via connection 132. Connection 131 may be a connection which does not traverse a public network, for example it may be a dedicated wire connection which is not used for other purposes than communication between control node 130 and first part 110. Connection 132 may be a connection which does not traverse a public network, for example it may be a dedicated wire connection which is not used for other purposes than communication between control node 130 and second part 120. Communication over connections 131 and/or 132 may use encryption.

Storing data "at rest" refers to storage of the data when it is not being actively used. For example, the data may be archived. While the data is available if needed, it is not being processed or searched, and it is acceptable that accessing the data may involve an initial delay. When data is not at rest, it may be "in use", or "in transit". Data stored at rest forms a target for hackers who may want to search or copy the contents of the data, or surreptitiously modify the data for their own ends. One form of attack is to encrypt the data and request payment in exchange for providing the key needed for decryption. Even copying of data which is encrypted at rest poses a risk, as the abilities of cryptanalysis may progress with new computers, such as quantum computers, or mathematical breakthroughs to an extent that the encryption is overcome by attackers. Fifth generation, 5G, of mobile network technology places greater emphasis on cybersecurity compared to previous generations. Capabilities of 5G networks create more confidential data to flow through the mobile 5G network. Not only are more humans getting connected for their private and public uses, but also machines, robots, cars, and artificial intelligence, AI, enabled devices will use 5G networks for communication. 5G needs be able to provide long-term security for data transmitted through the network by enterprises, government, military, transportation, critical infrastructure and other kinds of users. This will create a responsibility on the 5G network to ensure dependable security is available when being designed and deployed.

With evolving uses cases from 5G, the need is present for secure storage of strong credentials for Internet of Things, IoT, devices such as gaming consoles, connected vehicles and medical devices, and even root keys that ensure the authenticity of block chain participants, and digital payments. Evolving security needs concerning user data and user identity storage trend toward more users moving their data from centralized cloud data stores to decentralized data stores, on premises or personal data stores in homes.

Using light for communicating, such as in light beam 101, provides several benefits. Firstly, light cannot be disturbed by radio interference. Secondly, light-based communication is inherently secure as light cannot penetrate walls and is inherently contained in buildings where it is used, unlike radio emissions. Thirdly, a field of view of a light beam, such as light beam 101, may be controlled such that the beam is directed to a receiver, and not radiated in other directions. Radiating in directions other than toward the receiver provides opportunity for eavesdropping. Fourthly, using light-based communication does not preclude using conventional security techniques, such as encryption, in information communicated using the light. Information communicated over light beam 101 may be encrypted, for example by using TLS or another encryption mechanism.

To write data into the data storage apparatus, client 140 may transmit the data to first part 110 via connection 141. The data may be provided in one or more chunks, depending on the data and on the particular embodiment used. The data may be in encrypted form, wherein it may also be stored in the data storage apparatus in encrypted form such that only client 140 can reverse the encryption. It is up to the client to decide, in which form the one or more chunks of data is provided for storage.

First part 110 may query from control node 130, whether the client may store data in the data storage apparatus. This querying may proceed via connection 131, for example. In other embodiments, first part 110 is configured to decide autonomously on a write request, without involving control node 130. In some embodiments, control node 130 is absent. For example, a write request involving writing an executable file to the data storage apparatus may be refused in first part 110 or control node 130. As another example, a write request which requests too large a quantity of data to be written to the data storage apparatus may be refused. For example, clients may have client-specific storage quotas which are enforced by control node 130 or first part 110 in connection with authorizing write requests. In the event client 140 is authorized to write the data into the data storage apparatus, light beam 101 is switched on and the data communicated to second part 120, which writes the data into non-volatile memory 122. The light beam may be switched on by control node 130 signalling to first part 110 and second part 120, for example, or by first part 110 activating light-based communication port 114 which second part 120 may detect. Authorization to use the data storage apparatus may be provided by giving client 140 a cryptographic token, for example, which client 140 may include in its write request. Control node 130 or first part 110 may be configured to verify the token. In some embodiments, authorization is split between first part 110 and control node 130, such that first part 110 checks the request conforms to policies stored in the first part, and the request is forwarded from first part 110 to control node 130 for decision only if the request conforms with the policies. This solution reduced the load on control node 130.

Once the write operation is complete, light beam 101 may be switched off, isolating the data, stored in non-volatile memory 122 from the network where client 140 is present. Hackers seeking to steal the data cannot reach the data as long as light beam 101 is off. Where optical shutter 126 is present, control node 130 may instruct the optical shutter to move into the second position where light beam 101 is blocked. Therefore, hackers could not steal the data without both switching on light beam 101 and moving optical shutter 126 back into the first position. In case optical shutter 126 is present in second part 120, control node 130 may instruct its movement via connection 132, for example. Client 140 may be provided an identifier of the data set or data block written into the data storage apparatus, for future use in requesting the data, for example.

In some embodiments, the data storage apparatus comprises a mechanism to move second part 120 into a position where light-based communication port 114 and light-based communication port 124 are not aligned with each other, making light-based communication between the first part and the second part impossible for this reason. The mechanism may comprise a rail, for example, to move second part 120 out of alignment, for example into a storage cabinet. The mechanism may be controlled by control node 130, or by a second control node, which is not illustrated in FIG. 1 for the sake of clarity. The mechanism provides yet another isolation of the data from the network where client 140 is comprised. The mechanism may be present alternatively to, or in addition to, optical shutter 126.

To read data from the data storage apparatus, client 140 may request the data via connection 141, for example. Client 140 may provide the identifier of the data set or data block it wishes to read, to identify the data that the read request concerns. Client 140 may have been provided this identifier at the end of a write operation concerning the same data, for example. First part 110 may verify the client is authorized to read the data before providing access to the data. For example, client 140 may have a token issued in connection with the write operation, the token comprising a hash of the data, for example. First part 110 may verify the client is authorized to access the data by requesting, via connection 131, control node 130 to perform an authorization task concerning client 140 and the requested data. In case the client is not authorized to access the data, in either a read or write operation, the request is rejected, explicitly by sending a reject message or implicitly by discarding the request without responding to it. In other words, first part 110 rejects such requests in case it does not receive an authorization concerning them from the control node, or if first part 110 itself is the entity which authorizes reads and writes. In embodiments where control node 130 is not present, first part 110 may be configured to decide on authorizing read requests autonomously.

Responsive to the client being authorized to access the data, light beam 101 is switched on to enable communication between first part 110 and second part 120. In case optical shutter 126 is present, control node 130 may instruct its movement to the first position, enabling optical communication between first part 110 and second part 120. In case the mechanism to move second part 120 is present, control node 130 or the further control node may command the movement of second part 120 to a position in which it is aligned with first part 110, enabling optical communication between the parts. Once optical communication is thus established, the data is provided to client 140 from non-volatile memory 122 via light beam 101, first part 110 and connection 141. Once the read operation is complete, light beam 101 may be switched off. Where applicable, the optical shutter 126 may be moved to the second position to block light beam 101 and/or second part 120 may be moved out of alignment with the first part using the mechanism, such as the rail.

In some embodiments, a user of control node 130 must manually accept read requests for them to be authorized. In other embodiments, the authorization of read requests in first part 110 or in control node 130 is automatic and proceeds without user interaction. Such automatic authorization may be based on cryptographic tokens, data identifiers and/or cryptographic signatures of client 140, for example. For example, where a read request bears a valid cryptographic signature of an authorized client, the read request may be authorized by first part 110 or control node 130.

In case optical shutter 126 is in second part 120 and/or the mechanism to move second part 120 is present, control node 130 may be needed, as light beam 101 may be the only direct form of communication between first part 110 and second part 120 and first part 110 cannot request the movement of optical shutter 126 or movement of second part 120 when light beam 101 is not active. Connections 131 and 132 may be configured by physical limitations to have only a limited data communication capacity, making it unfeasible for hackers to steal data from second part 120 using these connections when light beam 101 is off. For example, connections 131 and 132 may have a communication capacity of less than 48 bits per second, less than 128 bits per second or at most 1 kilobit per second.

FIG. 2 illustrates an example system in accordance with at least some embodiments of the present invention. The figure illustrates the same system as FIG. 1, with the difference that optical shutter 126 is in the second position, blocking light beam 101 from communicating anything between first part 110 and second part 120. Light beam 101 is marked in the figure as a dotted line to denote where it would be if it were active.

Figure 3:
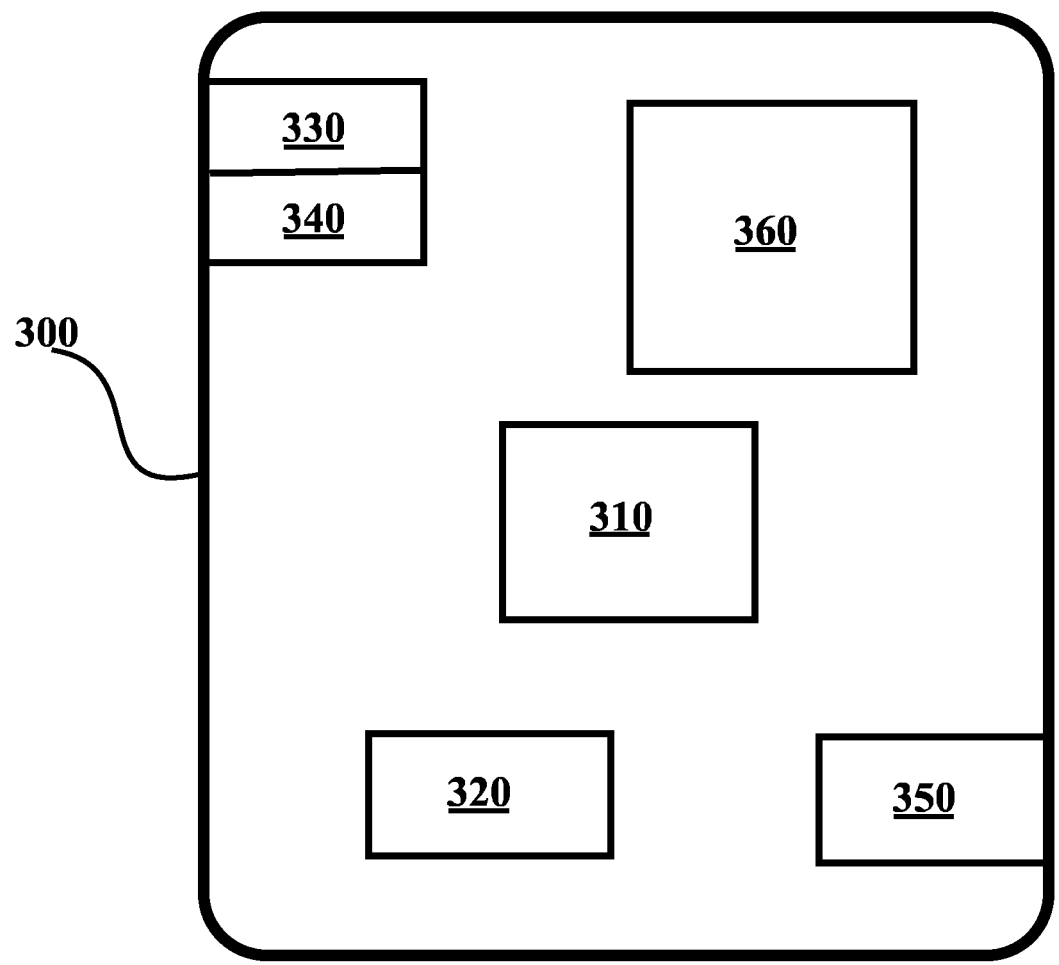
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, first part 110 or control node 130 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as communicating and deactivating. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as data storage apparatus or control node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate based on emitting and measuring light, for example, as described herein above.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure access rules for read/write operations. Device 300 may lack one or more of the entities described herein, depending on the embodiment.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4A:
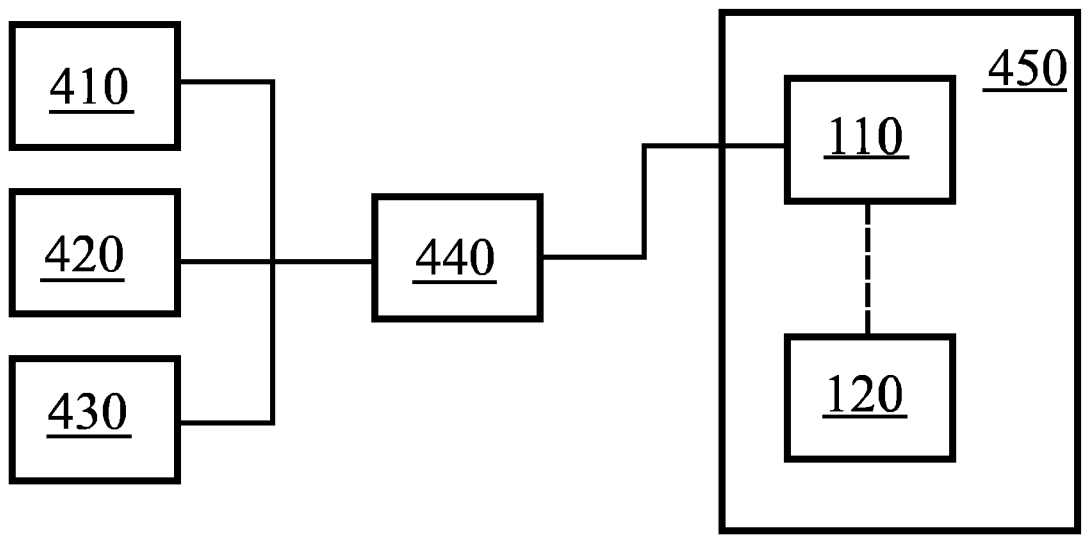
FIG. 4A illustrates an example system in accordance with at least some embodiments of the present invention.

FIG. 4A illustrates an example system in accordance with at least some embodiments of the present invention. The illustrated system is one where the data storage apparatus is interfaced with a 5G network. A unified data management, UDM, 410, a policy control function, PCF, 420, and a network exposure function, NEF, 430, are operatively connected with a unified data repository, UDR, 440. These nodes are nodes or functionalities of a 5G network. UDR 440 is connected with first part 110, which in turn has the light-based interface with second part 120 which has been described above. First part 110 and second part 120 are comprised in the data storage apparatus 450.

Figure 4B:
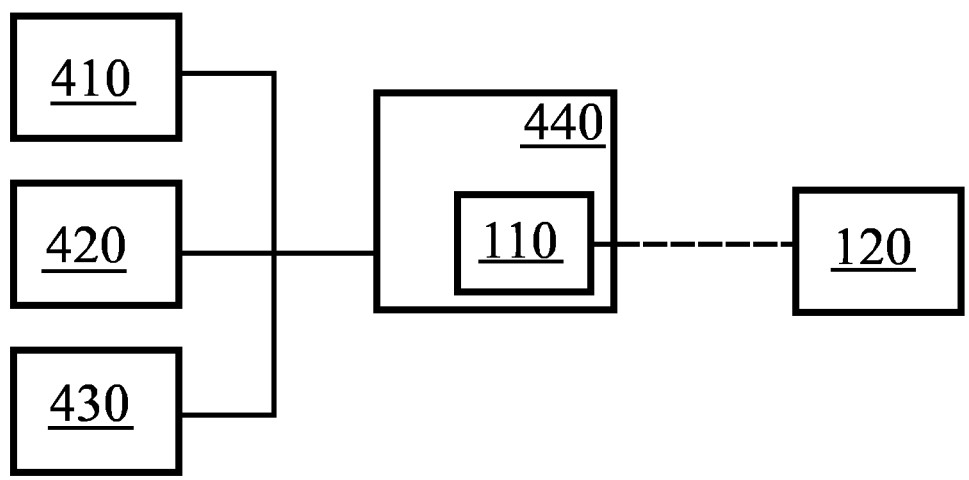
FIG. 4B illustrates an example system in accordance with at least some embodiments of the present invention.

FIG. 4B illustrates an example system in accordance with at least some embodiments of the present invention. Like numbering denoted like structure as in FIG. 4A. This system resembles the one illustrated in FIG. 4A, with the exception that first part 110 is comprised in UDR 440. The light-based interface is thus from first part 110 in UDR 440 to the second part 120.

Concerning both FIG. 4A and FIG. 4B, 5G subscriber data repository UDR can use the data storage apparatus to store critical data like encryption keys in the described second part 120 and retrieve it from there when needed.

Figure 5:
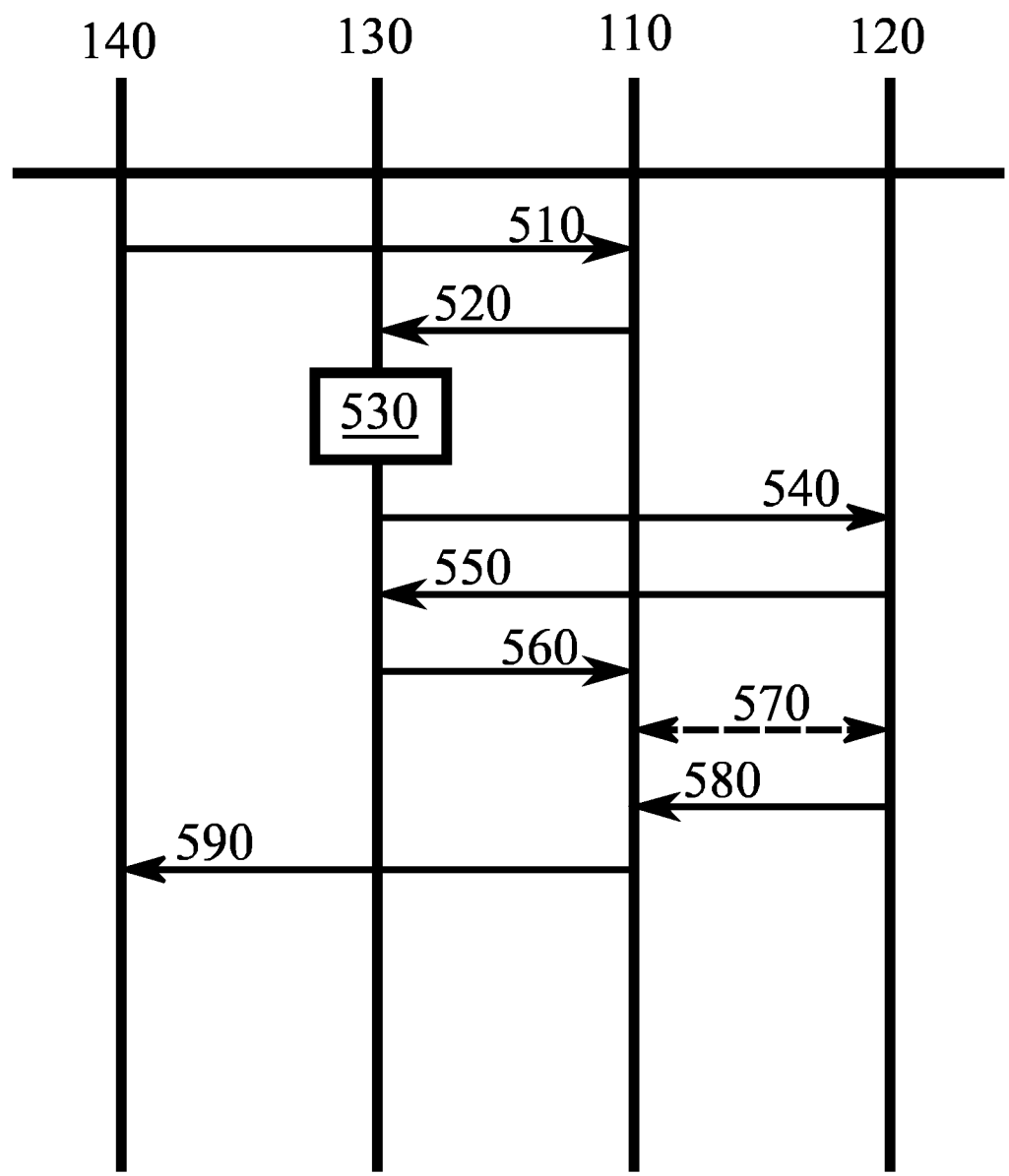
FIG. 5 illustrates signalling in accordance with at least some embodiments of the present invention.

FIG. 5 illustrates signalling in accordance with at least some embodiments of the present invention. On the vertical axes are disposed, from the left, in terms of FIG. 1 and FIG. 2, client 140, control node 130, first part 110, and second part 120 on the right. Time advances from the top toward the bottom.

In phase 510, data to be stored in the data storage apparatus is provided to first part 110 from client 140. This provision may be encrypted, and/or may comprise providing a token to demonstrate a right to use the data storage apparatus, for example.

In phase 520, first part 110 queries from control node 130, whether the write operation requested in phase 510 should be allowed to proceed. In phase 530, control node 130 forms an authorization decision concerning the write operation which may comprise, for example, verifying a token provided by client 140, and/or verifying a cryptographic signature of client 140 provided in phase 110. If control node 130 does not authorize the write operation, the write operation will not be performed and processing ends. If control node 130 decides to authorize the requested write operation, processing advances to phase 540, where control node 130 requests second part 120 to move the optical shutter to the first position, enabling optical communication between first part 110 and second part 120. Second part 120 acknowledges in phase 550 that the optical shutter is in the first position.

Responsive to phase 550, control node 130 authorizes, phase 560, first part 110 to go ahead with the requested write operation. In phase 570 the optical connection between first part 110 and second part 120 is switched on, and the data to be written is conveyed over the optical communication path from first part 110 to second part 120. Second part 120 stores the data in the non-volatile memory comprised in second part 120. Once the data is stored, second part 120 acknowledges this to first part 110, phase 580, which in turn informs client 140 the write operation is complete, phase 590. Alternatively, phase 580 may go through control node 130, which may convey the acknowledgement to client 140 via first part 110. In phase 590, the client may be given an identifier of the stored data set or data block, which client 140 may use when requesting the data in a read operation later on. After phase 580, the optical communication pathway activated in phase 570 may be switched off. The optical shutter may be moved back to the second position which blocks optical communication between first part 110 and second part 120. An advantage in sending the message of phase 580 to the control node 130 is that the control node is then informed that the optical shutter is in the closed, second, position.

FIG. 6 is a flow graph of a method in accordance with at least some embodiments of the present invention. The phases of the illustrated method may be performed in the data storage apparatus comprising first part 110 and second part 120, or in a control device configured to control the functioning thereof, when installed therein.

Phase 610 comprises communicating, by a first part of an apparatus, with a second part of the apparatus using a first light-based communication port comprised in the first part and communicating, by the first part, with a client using a network interface comprised in the first part. Phase 620 comprises communicating, by the second part of the apparatus, the second part comprising a non-volatile memory, with the first part using a second light-based communication port comprised in the second part. Finally, phase 630 comprises deactivating at least one of the first light-based communication port and the second light-based communication port responsive to determining that a read or write operation in the non-volatile memory is complete.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in storage of data.

We claim:

1. An apparatus comprising:
a first part which comprises a first light-based communication port and a network interface;
a second part which comprises a non-volatile memory and a second light-based communication port configured to communicate with the first light-based communication port using a light beam;
at least one processor;
at least one memory storing instructions that, when executed by the at least one processor, cause the apparatus at least to deactivate at least one of the first light-based communication port and the second light-based communication port responsive to determining that a read or write operation in the non-volatile memory is complete; and
a mechanism to move the second part into a first position where the first light-based communication port and the second light-based communication port are not aligned with each other, making light-based communication between the first and second light-based communication ports impossible.

2. The apparatus according to claim 1, wherein the first part is with the at least one memory storing the instructions that, when executed by the at least one processor, cause to request approval from a control node distinct from the apparatus for at least one of: read requests and write requests concerning reading and writing data, respectively, in the non-volatile memory, and to reject the at least one of read requests and write requests which are not approved by the control node.

3. The apparatus according to claim 2, wherein the apparatus is further caused to request the approval from the control node using a dedicated connection which does not traverse a public network.

4. The apparatus according to claim 1, further comprising in the first part or in the second part an optical shutter, which selectably obstructs and exposes the first and second light-based communication ports to each other.

5. The apparatus according to claim 4, wherein the apparatus is further caused to move the optical shutter to expose or obstruct the first and second light-based communication port to each other as a response to an instruction from a control node.

6. The apparatus according to claim 5, wherein the optical shutter is in the second part, and the second part is caused to receive the instruction from a control node using a second dedicated connection, between the control node and the second part, which does not traverse a public network.

7. The apparatus according to claim 1, further caused to move the second part to and from the first position responsive to move commands received in the apparatus from a control node.

8. A method comprising:
communicating, by a first part of an apparatus, with a second part of the apparatus using a first light-based communication port comprised in the first part and communicating, by the first part, with a client using a network interface comprised in the first part;
communicating, by the second part of the apparatus, the second part comprising a non-volatile memory, with the first part using a second light-based communication port comprised in the second part, the second light-based communication port configured to communicate with the first light-based communication port using a light beam;
deactivating at least one of the first light-based communication port and the second light-based communication port responsive to determining that a read or write operation in the non-volatile memory is complete; and
moving, using a mechanism, the second part into a first position where the first light-based communication port and the second light-based communication port are not aligned with each other, making light-based communication between the first and second light-based communication ports impossible.

9. The method according to claim 8, further comprising requesting, by the first part, approval from a control node distinct from the apparatus for at least one of: read requests and write requests concerning reading and writing data, respectively, in the non-volatile memory, and rejecting the at least one of read requests and write requests which are not approved by the control node.

10. The method according to claim 9, wherein the requesting of the approval from the control node is performed using a dedicated connection which does not traverse a public network.

11. The method according to claim 8, further comprising selectably obstructing and exposing the first and the second light-based communication port to each other using an optical shutter comprised in the first part or in the second part.

12. The method according to claim 9, further comprising; selectably obstructing and exposing the first and the second light-based communication port to each other using an optical shutter comprised in the first part or in the second part; and moving the optical shutter to expose or obstruct the first and the second light-based communication port to each other as a response to an instruction from the control node.

13. The method according to claim 12, wherein the optical shutter is in the second part, and the method further comprises receiving, in the second part, the instruction from the control node using a second dedicated connection, between the control node and the second part, which does not traverse a public network.

14. The method according to claim 9, wherein the moving of the second part to and from the first position is performed responsive to move commands received in the apparatus from the control node.

15. A non-transitory computer readable medium having stored thereon a set of computer readable instructions that, when executed by at least one processor, cause an apparatus to at least:
communicating, by a first part of the apparatus, with a second part of the apparatus using a first light-based communication port comprised in the first part and communicating, by the first part, with a client using a network interface comprised in the first part;
communicating, by the second part of the apparatus, the second part comprising a non-volatile memory, with the first part using a second light-based communication port comprised in the second part, the second light-based communication port configured to communicate with the first light-based communication port using a light beam;
deactivating at least one of the first light-based communication port and the second light-based communication port responsive to determining that a read or write operation in the non-volatile memory is complete; and
moving, using a mechanism, the second part into a first position where the first light-based communication port and the second light-based communication port are not aligned with each other, making light-based communication between the first and second light-based communication ports impossible.

* * * * *